United States Patent [19]
Ikarashi et al.

[11] Patent Number: 5,698,286
[45] Date of Patent: Dec. 16, 1997

[54] MAGNETIC RECORDING MEDIUM

[75] Inventors: Tsunehiko Ikarashi; Yasufumi Takasugi; Tsutomu Aoyama; Akira Saitoh; Yuko Motegi; Takayoshi Kuwajima, all of Tokyo, Japan

[73] Assignee: TDK Corporation, Tokyo, Japan

[21] Appl. No.: 719,205

[22] Filed: Sep. 25, 1996

Related U.S. Application Data

[63] Continuation of Ser. No. 128,708, Sep. 30, 1993, abandoned.

[30] Foreign Application Priority Data

| Sep. 30, 1992 | [JP] | Japan | 4-285439 |
| Oct. 1, 1992 | [JP] | Japan | 4-286886 |
| Mar. 9, 1993 | [JP] | Japan | 5-075410 |
| Mar. 9, 1993 | [JP] | Japan | 5-075411 |

[51] Int. Cl.$^6$ .............. G11B 5/66; G11B 5/70; B32B 3/02
[52] U.S. Cl. ............ 428/65.3; 428/65.4; 428/336; 428/402; 428/694 B; 428/694 BN; 428/694 BS; 428/900
[58] Field of Search .............. 428/694 B, 694 BN, 428/694 BS, 336, 402, 65.3, 65.4, 900; 427/127, 131

[56] References Cited

U.S. PATENT DOCUMENTS

| 4,963,433 | 10/1990 | Ogawa et al. | 428/323 |
| 5,258,223 | 11/1993 | Inaba et al. | 428/323 |
| 5,324,582 | 6/1994 | Goto et al. | 428/323 |
| 5,336,559 | 8/1994 | Yamagishi et al. | 428/329 |
| 5,354,610 | 10/1994 | Ozawa et al. | 428/323 |

FOREIGN PATENT DOCUMENTS

| 0 442 422 | 8/1991 | European Pat. Off. |
| 60-131626 | 7/1985 | Japan |
| 60-143432 | 7/1985 | Japan |
| 63-191315 | 2/1987 | Japan |
| 63-191318 | 2/1987 | Japan |

OTHER PUBLICATIONS

Database WPI, Derwent Publications, AN–92 335020, JP–A–04 238 111, Aug. 26, 1992.
Database WPI, Derwent Publications, AN–92 203067, JP–A–04 117 618, Apr. 17, 1992.

*Primary Examiner*—Paul J. Thibodeau
*Assistant Examiner*—Stephen Sand
*Attorney, Agent, or Firm*—Oblon, Spivak, McClelland, Maier & Neustadt, P.C.

[57] ABSTRACT

A magnetic layer is provided on a nonmagnetic base with a non-ferromagnetic layer interposed between them. Non-ferromagnetic particulate iron oxide is incorporated in the non-ferromagnetic layer. In addition to, or in place of, this iron oxide, non-structural carbon having a mean particle diameter of 10 to 60 nm, a specific surface area of 150 m2/g as measured by the BET method and a DBP oil absorption of 100 ml/100 g or less may be used. This makes it possible to achieve a magnetic recording medium having excellent surface properties and good-enough electromagnetic transducing characteristics.

20 Claims, No Drawings

MAGNETIC RECORDING MEDIUM

This application is a Continuation of application Ser. No. 08/128,708, filed on Sep. 30, 1993, now abandoned.

BACKGROUND OF THE INVENTION

1. Field of the Invention

The present invention relates to a coated type of magnetic recording medium.

2. Discussion of the Background

In magnetic recording media represented by high-performance audio cassette tapes, various video tapes, DATs and diverse magnetic discs there is now left much to be desired in terms of high-density recording. To make high-density recording possible, for instance, it has been proposed to use magnetic metal powders as a magnetic powder material, and this is now put to practical use.

To achieve high-density recording, on the other hand, media must be fabricated while taking their thickness and self-demagnetizing losses into account and the magnetic layers are required to be thinned from this point-of-view. With a thin magnetic layer, however, the surface properties of the base or substrate are reflected on the magnetic layer, often causing the electromagnetic transducing characteristics to be adversely affected. For this reason, it has so far been put forward to provide on the surface of a substrate a nonmagnetic layer in which, for instance, thermosetting resin is used as a binder, and provide a magnetic layer with the nonmagnetic layer interposed between it and the substrate. However, a grave problem with this nonmagnetic layer is that its durability is less than satisfactory.

In the medium arrangement mentioned above, the magnetic layer is formed on the previously coated and dried nonmagnetic layer. Although depending on the binder resin used, this causes the surface properties of the magnetic layer to be adversely affected by the surface properties of the nonmagnetic layer.

To solve this problem, JP-A-63-191315 and 63-191318 disclose the so-called wet-on-wet procedure in which a nonmagnetic undercoat having magnetic powders dispersed in a binder of, e.g., thermoplastic resin, is provided, and this undercoat and a magnetic layer are superposed on each other while both the coating solutions remain wet. The examples of both the specifications teach that $\alpha$-$Fe_2O_3$ is used as the nonmagnetic powders, but this $\alpha$-$Fe_2O_3$ appears to be in an acicular form. They also state that such arrangements enable the electromagnetic transducing characteristics, durability and head wear losses to be improved.

In the case of magnetic recording media such as video tapes and floppy discs (FDs) that are used on a digital recording mode, however, it is required to make the magnetic layers much thinner in association with high-density recording. Thus, since the surface properties of even media obtained with such nonmagnetic layers as set forth in the above-mentioned specifications are still insufficient, there is left much to be desired in this regard.

SUMMARY OF THE INVENTION

A primary object of the invention is to provide a magnetic recording medium having excellent surface properties and good-enough electromagnetic transducing characteristics.

This object is achieved by the following arrangements (1) to (22).

(1) A magnetic recording medium including a nonmagnetic base and a magnetic layer containing magnetic powders and a resin binder, which is provided on the base with a non-ferromagnetic layer interposed between the substrate and the magnetic layer, wherein:

said non-ferromagnetic layer contains a spherical, non-ferromagnetic, particulate iron oxide and a resin binder at a weight ratio of 100/5 or less.

(2) A magnetic recording medium as recited in (1), wherein said particulate iron oxide is mainly made up of $\alpha$-$Fe_2O_3$.

(3) A magnetic recording medium as recited in (1), wherein said particulate iron oxide has a mean aspect ratio of 1 to 2.

(4) A magnetic recording medium as recited in (1), wherein said particulate iron oxide has a mean particle diameter of 20 to 80 nm.

(5) A magnetic recording medium as recited in (1), wherein said particulate iron oxide has a specific surface area of 20 to 80 $m^2/g$, as measured by the BET method.

(6) A magnetic recording medium as recited in (1), wherein said weight ratio of the (particulate iron oxide) to the (resin binder) lies between 100/50 and 100/5.

(7) A magnetic recording medium as recited in (1), wherein said non-ferromagnetic layer is formed with the use of a coating solution containing said particulate iron oxide at a content of 10 to 60% by weight.

(8) A magnetic recording medium as recited in (1), wherein said non-ferromagnetic layer further contains a nonmagnetic, electrically conductive substance.

(9) A magnetic recording medium as recited in (8), wherein the weight ratio of the (total of particulate iron oxide and electrically conductive substance) to the (resin binder) lies between 100/50 and 100/5.

(10) A magnetic recording medium as recited in (8), wherein the content of said electrically conductive substance is 20 to 70% by weight relative to said non-ferromagnetic, particulate iron oxide.

(11) A magnetic recording medium as recited in (8), wherein said electrically conductive substance has a mean particle diameter of 10 to 60 nm, a specific surface area of 150 $m^2/g$ or less as measured by the BET method, and a DBP oil absorption of 100 ml/100 g or less.

(12) A magnetic recording medium as recited in (11), wherein said electrically conductive substance has a specific surface area of 20 to 150 $m^2/g$ as measured by the BET method and a DBP oil absorption of 20 to 100 ml/100 g.

(13) A magnetic recording medium as recited in (8), wherein said electrically conductive substance is a non-structural carbon.

(14) A magnetic recording medium as recited in (1), wherein said non-ferromagnetic layer has a thickness of 0.5 to 2.5 μm.

(15) A magnetic recording medium as recited in (1), wherein said magnetic layer has a thickness of 2.5 μm or less.

(16) A magnetic recording medium as recited in (1), wherein said non-ferromagnetic layer and said magnetic layer are provided in the wet-on-wet fashion.

(17) A magnetic recording medium as recited in (1), in which said base is a disc form of flexible member and which is used as a magnetic recording disc for recording on a group coded recording (GCR) mode with the minimum magnetization inversion separation of 0.75 μm or less.

(18) A magnetic recording medium as recited in (17), wherein the maximum magnetization inversion separation of a data portion on the same track is 2.5 to 5 times as large as the minimum magnetization inversion separation.

(19) A magnetic recording medium including a nonmagnetic base and a magnetic layer containing magnetic powders and a resin binder, which is provided on the base with a non-ferromagnetic layer interposed between the substrate and the magnetic layer, wherein:

said non-ferromagnetic layer and said magnetic layer are provided in the wet-on-wet fashion, and said non-ferromagnetic layer is formed with the use of a coating solution containing a non-structural carbon having a mean particle diameter of 10 to 60 nm, a specific surface area of 150 m$^2$/g or less as measured by the BET method and a DBP oil absorption of 100 ml/100 g or less and a resin binder at a weight ratio of 100/50 to 100/25, said coating solution containing said non-structural carbon in an amount of 10 to 20% by weight.

(20) A magnetic recording medium as recited in (19), wherein said non-structural carbon has a specific surface area of 20 to 150 m$^2$/g as measured by the BET method and a DBP oil absorption of 20 to 100 ml/100 g.

(21) A magnetic recording medium as recited in (19), wherein said magnetic layer is 2.5 μm or less in thickness.

(22) A magnetic recording medium as recited in (19), wherein the magnetic powders contained in said magnetic layer are magnetic powders of an oxide or metal.

DESCRIPTION OF THE PREFERRED EMBODIMENT

Some illustrative arrangements of the present invention will now be explained at great length. The magnetic recording medium according to the invention includes a magnetic layer on a nonmagnetic base with a non-ferromagnetic layer interposed between them. The non-ferromagnetic layer contains spherical, non-ferromagnetic, particulate iron oxide.

By use of the spherical, particulate iron oxide is it possible to achieve dispersibility so high that the rate of the particles filled in the non-ferromagnetic layer can be increased. This enables the surface properties of the non-ferromagnetic layer itself to be improved, and so allows the magnetic layer to have improved surface properties and electromagnetic transducing characteristics. Such effects cannot be obtained without using a spherical form of iron oxide; in other words, they are not achieved by use of an acicular form of iron oxide such as those set forth in JP-A-63-191315 and 63-191318, or other material such as titanium oxide, even though it is in a spherical form.

A main component of the iron oxide used is α-Fe$_2$O$_3$, and it is preferable that the α-Fe$_2$O$_3$ accounts for 90% by weight or more, particularly 95% by weight or more, of the iron oxide. In this connection, note that the upper limit is usually 90 to 100% by weight.

The iron oxide is in a substantially spherical form and should preferably have an aspect ratio, the major axis diameter/the minor axis diameter, of about 1 to 2, particularly 1 to 1.5.

The iron oxide has a particle diameter of 100 nm or less, preferably 80 nm or less and a mean particle diameter of 20 to 80 nm. Particle geometry, particle diameter, etc., may be determined by observation with a transmission electron microscope (TEM).

The iron oxide has a specific surface area of 20 to 80 m$^2$/g, preferably 30 to 60 m$^2$/g, as measured by the BET method, and has an oil absorption of about 25 to 30 ml/100 g, as measured by the JIS method, and an absolute specific gravity of about 5.2 g/ml.

Such spherical α-Fe$_2$O$_3$ may be produced by a salt catalyst technique, according to which α-Fe$_2$O$_3$ that is usually likely to grow in an acicular form can be grown in a spherical form. More illustratively but not exclusively, the starting materials ferric chloride (FeCl$_3$) and an alkali salt such as Na$_2$CO$_3$ may be allowed to react with each other. Alternatively, the reaction product of ferrous chloride (FeCl$_2$) with an alkali salt such as Na$_2$CO$_3$ may be oxidized with H$_2$O$_2$, etc.

Such spherical α-iron oxide (Fe$_2$O$_3$) is now commercially available, and the typical example is Ultrafine, Transparent Iron Oxide Nanotite® (made by Showa Denko K.K.), which may be used immediately for the present invention.

Preferably, such α-Fe$_2$O$_3$ should account for 60 to 95% by weight of the non-ferromagnetic layer. Alpha-Fe$_2$O$_3$, when used in a smaller content, is ineffective, and, when used in a larger content, has an adverse influence on the adhesion between the non-ferromagnetic layer and the base. The weight ratio of the (particulate iron oxide) to the (resin binder to be described later) is 100/5 or less, particularly 100/50 or more, preferably 100/40 to 100/9, and more preferably 100/35 to 100/10. At more than 100/5 there is a drop of film adhesion. At too low a weight ratio there is deterioration of the surface properties of the magnetic layer, when provided in the wet-on-wet fashion.

The binder resin used in the present invention may be electron radiation curing resin, thermoplastic resin, thermosetting resin or reactive resin which may be used alone or in admixture. In view of the resulting strength, etc., however, it is preferable to use thermosetting resin and electron radiation curing resin.

Illustratively and preferably, the thermosetting resin may be a mixture of a crosslinking agent with vinyl copolymer resin such as vinyl chloride-vinyl acetate (which may contain carboxylic acid), vinyl chloride-vinyl alcohol-vinyl acetate (which may contain carboxylic acid), chlorinated vinyl chloride, vinyl chloride-acrylonitrile, vinyl butyral or vinyl formal; a mixture of a crosslinking agent with polyurethane resin, polyester resin or cellulosic resin such as nitrocellulose or cellulose acetate butyrate, and a mixture of a crosslinking agent with synthetic rubber such as butadiene-acrylonitrile. These mixtures may be used in combination of two or more. These resins may contain a polar group such as —SO$_3$M, —COOM, —N(R)$_2$ or —N(R)$_3$ where M stands for H or a monovalent metal such as Na and R represents a hydrogen atom or a monovalent hydrocarbon group such as an alkyl group. Moreover, use may be made of a mixture of an isocyanate prepolymer with a polycondensation type of resin such as phenolic resin, epoxy resin, butyral resin, formal resin, melamine resin, alkyd resin, silicone resin, acrylic reactive resin, polyamide resin, epoxy-polyamide resin or urea formaldehyde resin or high-molecular-weight polyester resin; a mixture of polyisocyanate with polyester polyol; a mixture of low-molecular-weight glycol/high-molecular-weight diol/triphenylmethane triisocyanate; a mixture of the above-mentioned polycondensation type of resin with a crosslinking agent such as an isocyanate compound, and so on.

Various polyisocyanates, esp., diisocyanate may be used as the crosslinking agent for curing the binder resin. Particular preference is given to using more than one of tolylene diisocyanate, hexamethylene diisocyanate and methylene diisocyanate. The content of the crosslinking agent preferably lies in the range of 10 to 30 parts by weight per 100 parts by weight of the resin. Such thermosetting resin may generally be set by a 12 to 48-hour heating at 50° to 70° C. in a heating oven.

It is also preferable to use as the binder a previously cured, electron radiation curing type compound, viz., electron radiation curing resin. Examples of the electron radiation curing compound are thermoplastic resins in which there is contained or introduced a group crosslinked or polymerized by exposure to electron radiations such as an acrylic double bond (acrylic or methacrylic acid having a radically polymerizable unsaturated double bond or their ester compounds), an allyl double bond (diallyl phthalate), or unsaturated double bonds of maleic acid or its derivative. Other compounds having unsaturated double bonds crosslinked and polymerized by exposure to electron radiations may also be used.

Examples of the thermosplastic resin capable of being modified into electron radiation curing resin are vinyl chloride copolymers, vinyl chloride-vinyl acetate, vinyl alcohol copolymers, vinyl chloride-acrylic copolymers, epoxy resin of saturated polyester, phenoxy resin, cellulose derivatives, and so on. These may be subjected to acrylic modification in conventional manners.

The thickness of the non-ferromagnetic layer upon dried may be chosen from a preferable range of 0.5 to 2.5 μm, particularly 1.0 to 2.5 μm. However, it is noted that the non-ferromagnetic layer must have a thickness accommodating to the system used. This is because, at too small a thickness, the surface properties of the nonmagnetic base are reflected on the surface of the non-ferromagnetic layer, producing an adverse influence on the surface of the magnetic layer. At too large a thickness, on the other hand, thickness losses are too increased to be suitable for high-density recording. The non-ferromagnetic layer may additionally contain a lubricant. This is particularly advantageous for the case where the overlying magnetic layer is extremely thin, because the still durability is improved.

Moreover, the non-ferromagnetic layer may contain a nonmagnetic, electrically conductive substance, and so on. By combined use of the electrically conductive substance, it is possible to lower the surface electric resistance and so make the surface properties much better. The surface electric resistance of the non-ferromagnetic layer may be $10^9$ Ω/sq or less, preferably less than about $10^6$ to $10^8$ Ω/sq. Likewise, the surface electric resistance of the magnetic layer may be $10^9$ Ω/sq or less, preferably $10^6$ to $10^8$ Ω/sq.

For the electrically conductive substance used in combination with the non-ferromagnetic, ultrafine iron oxide, any desired substance may be used with the proviso that it has a mean particle diameter of 10 to 60 nm, preferably 15 to 40 nm, a specific surface area of 150 m$^2$/g or less, preferably 20 to 150 m$^2$/g, more preferably 25 to 150 m$^2$/g and most preferably 30 to 130 m$^2$/g, as measured by the BET method, and a DBP oil absorption of 100 ml/100 g or less, preferably 20 to 100 ml/100 g, and more preferably 30 to 80 ml/100 g. For instance, carbon, $SnO_2$, $TiO_2 \cdot SnO_2$ (doped with Sb), and electrically conductive black titanium oxide (TiOx where $1 \leq x \leq 2$) may be used.

It is noted that the mean particle diameter may be found by observation with a transmission electron microscope (TEM). At a mean particle diameter less than 10 nm, the dispersibility of the conductive substance in the non-ferromagnetic layer is so decreased that the surface properties are adversely affected. At a mean particle diameter exceeding 60 nm the surface properties are again adversely affected. At a specific surface area exceeding 150 m$^2$/g difficulty is involved in dispersing the conductive substance in the non-ferromagnetic layer and preparing a highly filled coating material, and this makes it difficult to provide the magnetic layer in the wet-on-wet fashion, as will be explained. At a DBP oil absorption exceeding 100 ml/100 g, the same problems as mentioned in connection with the specific surface area arise. It is noted, however, that if the conductive substance has too small a specific surface area and too low a DBP oil absorption, then the surface properties of the non-ferromagnetic layer are adversely affected.

Of the conductive substances mentioned above, carbon is preferred so as to achieve satisfactory surface properties and electrical conductivity. Particular preference is given to non-structural carbon that has an undeveloped structure. Such non-structural carbon has a relatively low electrical conductivity but is so excellent in dispersibility that the rate of the pigment filled in the nonmagnetic layer can be increased. For this reason, the surface properties of the non-ferromagnetic layer itself and hence the surface properties of the magnetic layer can be improved, thus enabling the effect of the present invention to be enhanced.

The non-structural carbon is not particularly critical in terms of geometry; that is, it may be in spherical, flaky, bulky, or fibrous forms. However, preference is given to using spherical non-structural carbon. In the present invention, commercially available carbon products may immediately be used. For instance, mention is made of #45B, MA8B, #52B, CF9B, all made by Mitsubishi Chemical Industries, Ltd., and Raven 1060 made by Colombian Carbon Co., Ltd.

When the non-ferromagnetic layer contains $\alpha$-$Fe_2O_3$, the electrically conductive substance, preferably the non-structural carbon, and the resin binder, the weight ratio of the total amount of $\alpha$-$Fe_2O_3$ and the electrically conductive substance, preferably the non-structural carbon to the binder resin is in the range of 100/50 to 100/5, preferably 100/40 to 100/9. At less than 100/50 some difficulty is involved in providing the magnetic layer in the wet-on-wet fashion, as will be described later, and at higher than 100/5 it is difficult to prepare a coating material.

The total amount of $\alpha$-$Fe_2O_3$ and the non-structural carbon should preferably lie in the range of 60 to 95% by weight of the overall non-ferromagnetic layer. Alpha-$Fe_2O_3$ and the non-structural carbon, when used in a smaller amount, have no effect on the non-ferromagnetic layer and, when used in a larger amount, have an adverse influence on the adhesion between the non-ferromagnetic layer and the base.

Preferably, the content of the non-structural carbon is 20 to 70% by weight, particularly 30 to 60% by weight with respect to $\alpha$-$Fe_2O_3$. As the proportion of the amount of the non-structural carbon with respect to the amount of $\alpha$-$Fe_2O_3$ is less than 20% by weight, there is an increase in the electric resistance value of the non-ferromagnetic layer. At higher than 70% by weight there is an increase in thixotropy, which in turn makes it difficult to prepare a coating material. In particular, much difficulty is involved in providing the magnetic layer in the wet-on-wet fashion to be described later.

The binder resin used in the present invention may be thermoplastic resin, thermosetting resin, reactive resin and electron radiation curing resin, which may be used alone or in admixture.

The non-ferromagnetic layer may additionally contain a lubricant. This is particularly advantageous for the case where the overlying magnetic layer is extremely thin, because some improvement in still durability can be achieved.

In accordance with the present invention, the non-ferromagnetic layer may be formed with the use of a coating solution in which a spherical form of $\alpha$-$Fe_2O_3$ is dispersed, if required, together with the electrically conductive substance and which additionally contains resin, etc.

No particular limitation is imposed on the solvent used to this end. Illustratively but not exclusively, ketone solvents such as cyclohexanone and isophorone, alcohol solvents such as isopropyl alcohol and butyl alcohol, cellosolve solvents such as ethyl cellosolve and cellosolve acetate, and aromatic solvents such as toluene may be used depending on what purpose the coating solution is used for.

The amount of $\alpha$-$Fe_2O_3$, or the total amount of $\alpha$-$Fe_2O_3$ and the electrically conductive substance, in such a coating solution may lie in the range of 10 to 60% by weight, preferably 15 to 50% by weight, on solid basis. The less the amount, the more difficult is it to coat the magnetic layer in the wet-on-wet fashion to be described later. The more the amount, in contrast, the poorer the adhesion of the coated film to the substrate is.

The weight ratio of $\alpha$-$Fe_2O_3$ and optionally the electrically conductive substance to the resin lies in the range of 100/50 to 100/5, preferably 100/40 to 100/9, and more preferably 100/35 to 100/10. At less than 100/50 the surface properties of the magnetic layer, especially when formed in the wet-on-wet fashion, are adversely affected. At higher than 100/5, on the other hand, the adhesion of the coated film drops.

In another embodiment of the present invention, the non-ferromagnetic layer of the magnetic recording medium may be made up of the non-structural carbon and the above-mentioned resin binder without recourse to $\alpha$-$Fe_2O_3$. The non-structural carbon has a mean particle diameter of 10 to 60 nm, preferably 15 to 40 nm, a specific surface area of 150 $m^2/g$ or less, preferably 20 to 150 $m^2/g$, more preferably 25 to 150 $m^2/g$ and most preferably 60 to 150 $m^2/g$, as measured by the BET method, and a DBP oil absorption of 100 ml/100 g or less, preferably 20 to 100 ml/100 g, and more preferably 30 to 80 ml/100 g.

The non-structural carbon refers generally to one of an undeveloped structure. This non-structural carbon is so excellent in dispersibility that the rate of the carbon filled in the nonmagnetic layer can be increased. For this reason, the surface properties of the nonmagnetic layer itself and hence the surface properties of the magnetic layer can be improved, thus enabling the effect of the present invention to be achieved.

So far, carbon has been used with an undercoat for antistatic purposes, and structural carbon with the structure so well developed that it can be excellent in electrical conductivity has mainly been used to this end. The structural carbon referred generally to in the art is a carbon having a specific surface area of 140 to 1,500 $m^2/g$, as measured by the BET method, and a DBP oil absorption of about 100 to 400 ml/100 g.

Such structural carbon, if it has a small particle diameter, may be used to obtain a coat having good surface properties. Because of having a large specific surface area and a high DBP oil absorption, however, this carbon has difficulty in preparing a highly filled coating material and so is unsuitable for the provision of a magnetic layer in the wet-on-wet fashion to be described later. Only by use of a specific non-structural carbon having the physical properties mentioned above is it possible to obtain good-enough surface properties.

The mean particle diameter of the non-structural carbon must lie in the above-mentioned range for the reasons that at a mean particle diameter more than 60 nm the surface properties are adversely affected and at less than 10 nm the dispersibility and hence the surface properties are again adversely affected. It is noted that the mean particle diameter may be found by observation with a transmission electron microscope (TEM).

The carbon, when having a specific surface area more than 150 $m^2/g$, is so adversely affected in terms of dispersibility that it is difficult to prepare a highly filled coating material. Thus, it is particularly difficult to provide a magnetic layer in the wet-on-wet fashion to be described later. When the DBP oil absorption exceeds 100 ml/100 g, the same problems mentioned in connection with the specific surface area arise. Here it is noted that when a carbon whose specific surface area and DBP oil absorption are decreased is used, no good surface properties can be obtained. Also note that no particular limitation is imposed on other properties of the non-structural carbon, e.g., geometry, pH, volatile matter, and so on.

In the present invention, commercially available non-structural carbon products may immediately be used. For instance, mention is made of #45B, MA8B, #45L, #52B, CF9B, all made by Mitsubishi Chemical Industries, Ltd., and Raven 1060 made by Colombian Carbon Co., Ltd.

The weight ratio of the non-structural carbon to the resin may lie in the range of 100/50 to 100/25, and the amount of the non-structural carbon in the coating solution may usually lie in the range of 10 to 20% by weight, although it may optionally be determined depending on affinity for the magnetic layer provided on the nonmagnetic layer or handleability, etc. At less than the lower limit mentioned just above the carbon makes it difficult to provide the magnetic layer in the wet-on-wet fashion to be described later, and at more than the upper limit it is difficult to coat due to its too high viscosity. It is noted that the resins used, the thickness of the non-ferromagnetic layer, how to coat, and so on may be the same as already mentioned.

The magnetic layer provided on such a nonmagnetic layer contains magnetic powders and a binder.

For the magnetic powders used in this case, for instance, fine powders of oxides such as $\gamma$-$Fe_2O_3$, Co-containing $\gamma$-$Fe_2O_3$, $Fe_3O_4$, Co-containing $\gamma$-$Fe_3O_4$, $CrO_2$, barium ferrite and strontium ferrite, fine powders of metals such as Fe, Co and Ni or their alloys, fine powders of iron carbide may be used.

These magnetic powders may selectively be used depending on the type of the medium to which they are applied, but preference is given to fine powders of barium ferrite, a metal or its alloy and iron carbide. These magnetic powders may be used alone or in combination of two or more. When the magnetic powders of iron carbide are used, it is preferable that their surfaces are mainly made up of carbon and/or iron carbide. Also, when the fine powders of a metal are used, it is preferable that they are mainly made up of iron and additionally contain a rare earth element including Y. Moreover, it is preferable to use hot isotactic pressed (HIP) magnetic powders.

For the binder used with the magnetic layer, use may be made of the same one as used with the above-mentioned nonmagnetic layer. Preferably, the same binder should be used with both the layers. The magnetic powders account for 50 to 85% by weight, preferably 55 to 75% by weight.

The thickness of the magnetic layer upon dried, although determined depending on the system used therewith, is 2.5 µm or less, preferably between 0.15 µm and 1.5 µm. At such a thickness high recording density can be achieved. If required, the magnetic layer may additionally contain various additives such as inorganic, fine particles and lubricants.

The magnetic layer is formed using a magnetic coating material. For the solvent used in this case, use may be made of the same one as used for forming the non-ferromagnetic layer. The content of the magnetic powders in the magnetic coating material is 10 to 50% by weight, preferably 15 to 45% by weight. In the present invention, it is preferable that after the provision of the magnetic layer, a magnetic field is applied thereto to orient the magnetic particles therein. Then, the orientation of the magnetic particles may take place in the direction that may be longitudinal, vertical or diagonal with respect to the direction of traveling of the medium.

In the present invention, no particular limitation is imposed on the nonmagnetic base or substrate used for the magnetic recording medium; in other words, a material selected from various flexible materials and various rigid materials depending on what purpose it is used for may be formed into a tape or other member of given form and size according to various standards. For instance, polyester such as polyethylene terephthalate may be used as the flexible material.

In the present invention, it is preferable to provide the non-ferromagnetic and magnetic layers in the so-called wet-on-wet fashion, thereby making their surface properties much better. Of course, they may also be formed in the wet-on-dry fashion. According to the wet-on-wet fashion, the non-ferromagnetic layer is provided, and the magnetic layer is then provided while the non-ferromagnetic layer remains undried or wet. In accordance with the wet-on-dry fashion, in contrast, the non-ferromagnetic layer is provided and dried, followed by the provision of the magnetic layer. It is here noted that the wet-on-dry fashion is advantageous for the reason of coating work, for instance, it is independent on the physical properties of the magnetic coating material used. Also, it is noted that when reliance is on the wet-on-wet fashion, the provision of the nonmagnetic layer may be followed by the provision of the magnetic layer, or both the layers may be provided simultaneously.

No particular limitation is imposed on the coater used with such coating fashions. For instance, those set forth in JP-A-63- 191315 and 63-191318 may be used. In this case, use may be made of a coater arrangement having a plurality of coating ports or heads.

If required, the magnetic recording medium according to the present invention may be provided with a back coat layer, etc. Moreover, this magnetic recording medium may have a magnetic layer on one side or magnetic layers on both sides.

Preferably, the magnetic recording medium according to the present invention, for instance, is applied to video tapes or floppy discs used on a digital recording mode. The digital recording mode takes place at a minimum recording wavelength of 0.3 to 1.5 µm, and the recording depth of the medium is then between 0.15 µm and 0.75 µm. As well known in the art, by making the thickness of the magnetic layer equal to the recording depth of the medium at the minimum recording wavelength is it possible to obtain good-enough output, resolving power and overwriting characteristics.

When the recording medium according to the present invention is used in the form of a video tape, the thickness of the magnetic layer, for the most part, is as this as about 0.15 to 0.3 µm and metal or barium ferrite powders are mainly used as the magnetic powders. When it is used in the form of a floppy disc, the magnetic layer is 0.30 to 1.00 µm in thickness. Again, metal or barium ferrite powders are mainly used as the magnetic powders.

Most preferably, the present invention can be applied to a magnetic recording disc, esp., a floppy disc (FD). So far, the floppy disc has been used on a saturation recording mode in which case the magnetic layer is overall magnetized. According to this recording mode, the recording depth is determined depending on the coercive force of the medium, head material, head gap length and recording magnetomotive force. In currently available systems, however, the recording depth is about half of the bit inversion separation. Hence, when the bit inversion separation is 1 µm or less, the recording depth becomes 0.5 µm or less; that is, it is required to regulate the thickness of the magnetic layer to 0.5 µm or less. As the magnetic layer decreases in thickness, however, there is a drop of the ability of the magnetic layer to be calendered, thus leading to a problem that the surface properties of the magnetic layer is so adversely affected that the output and resolving power drop.

When the bit inversion separation decreases to 1 μm or less, therefore, an unsaturated recording mode wherein only the surface portion of the magnetic layer is magnetized is often used. The unsaturated recording mode allows the thickness of the magnetic layer to be designed to be more than the recording depth, and so enables the magnetic layer to be set at a thickness of about 2 μm at which its surface properties are unlikely to degrade.

For an FD having increased memory capacity, on the other hand, a modulation mode with higher recording efficiency (a coded mode) is now under investigation. An MFM modulation mode that has so far been frequently used in the art is a sequentially coded mode wherein input data are converted into recording codes for each bit. In contrast, (2, 7), (1, 7) and other codes are used on block coded modes wherein input data are stored in a buffer memory for each block, and then converted into recording coded characters according to some suitable rule. The above-mentioned two types of coded modes make use of run-length limited codes (RLLCs), in which the serial number of 0 interposed between symbols 1 in the coded characters is limited. These block coded modes enable more information to be recorded as compared with the MFM mode; the (2, 7) coded mode enables the information recorded to be 1.5 times as much and the (1, 7) code mode enables the formation recorded to be 1.78 times as much.

However, the (2, 7) or (1, 7) code mode is more unfavorable in terms of O/W characteristics than the MFM mode, because overwriting (O/W) is needed for signals of longer wavelength due to an increased ratio of the minimum separation (Tmin) to the maximum separation (Tmax) between symbols 1. To improve the O/W characteristics, saturation recording must be done with a thin magnetic layer. However, as the magnetic layer becomes thin, the above-mentioned problem arises, making it difficult to make a compromise between the O/W characteristics and the output and resolving power. According to the present invention, however, it is possible to achieve a magnetic recording disc of high output and resolving power and of good-enough overwriting (O/W) characteristics.

That is, the present invention provides a magnetic disc which includes a magnetic layer on a flexible nonmagnetic base with a non-ferromagnetic layer interposed between them, and is usefully applied to a magnetic disc used on the group coded recording (GCR) mode so as to achieve increased memory capacity. The "GCR mode" referred to herein is a concept including RLLC (run-length limited code) that can be said to be an extension type of GCR, and so is directed to the block coded mode. This recording mode takes place at a minimum magnetization inversion separation of 0.75 μm (corresponding to the recording wavelength of 1.5 μm) or less, usually of 0.35 to 0.75 μm. It is here noted that the "minimum magnetization inversion separation" refers to the shortest magnetization inversion separation at the innermost side of each zone in the case of zone bit recording (ZBR) mode in which the transfer speed varies at the inner and outer sides during recording. When the ZBR is not carried out, it refers to the magnetization inversion separation at the innermost side. It is noted that the maximum magnetization inversion separation of the data portion on the same track is 2.1 to 1.6 times, preferably 2.5 to 5 times, as large as the minimum magnetization inversion separation.

According to the block coded mode, input data are stored in a buffer memory for each block, and are then converted into recording coded characters according to some suitable rule. These include (2, 7), (1, 7) and other codes, which are codes corresponding to the above-mentioned RLLC and having limitation imposed on the serial number of 0 interleaved symbols 1. For instance, the (2, 7) code mode is one in which the number of 0 interleaved between symbols 1 is limited to 2 to 7, with six magnetization inversion cycles, (3/2)Tb, (4/2)Tb, (5/2)Tb, (6/2)Tb, (7/2)Tb and (8/2)Tb, where Tb refers to a bit cycle.

For the comparison of the MFM modulation mode that has generally been used in the art, parameters of the (2, 7) and (1, 7) codes are shown in Table A wherein CR refers to the code ratio. The larger the CR, the larger the width of a detection window to the bit cycle, and this is favorable. In Table A DR refers to the density ratio. The larger the DR, the larger the quantity of information to be recorded per magnetization inversion separation, and this is again favorable. Recording efficiency can be obtained from the product of CR and DR.

TABLE A

|  | d | k | Tmin | Tmax | CR | DR | CR × DR |
|---|---|---|---|---|---|---|---|
| MFM | 1 | 3 | 1.00 Tb | 2.00 Tb | 0.5 | 1.0 | 0.5 |
| (2, 7) code | 2 | 7 | 1.50 Tb | 4.00 Tb | 0.5 | 1.5 | 0.75 |
| (1, 7) code | 1 | 7 | 1.33 Tb | 5.33 Tb | 0.67 | 1.33 | 0.89 | d: the minimum value of the serial number of 0 interleaved between 1
k: the maximum value of the serial number of 0 interleaved between 1
Tmin: the minimum separation between 1
Tmax: the minimum separation between 1
Tb: bit cycle
DR: Tmin/bit cycle
CR: width of detection window/bit cycle As will be appreciated from Table A, these recording modes enable more information to be recorded as compared with the MFM mode; the (2, 7) coded mode enables the information recorded to be 1.5 times as much and the (1, 7) coded mode enables the formation recorded to be 1.78 times as much. However, the (2, 7) or (1, 7) mode is more unfavorable in terms of O/W characteristics than the MFM mode, because overwriting (O/W) is needed for signals of longer wavelength due to an increased Tmin to Tmax ratio. For instance, consider the case where, without recourse to ZBR, recording is carried out on the (2, 7) code mode with the use of, e.g., a floppy disc operating at 360 rpm, track radii of 23.014 mm at the innermost side 1 and 39.500 mm at the outermost side 0 and recording frequencies of RL7:234 kHz and RL2:625 kHz. The then wavelength (twice as large as the above-mentioned magnetization inversion separation) and recording density are as follows.

|  | RL7 (234 kHz) | RL2 (625 kHz) |
| --- | --- | --- |
| Outermost Side 0 | 6.35 µm (8.0 kFCI) | 2.38 µm (21.3 kCFI) |
| Innermost Side 1 | 3.70 µm (13.7 kFCI) | 1.39 µm (36.6 kFCI) |

With the recording modes mentioned above, increased memory capacity is achieved, but no good O/W characteristics are obtained, as already noted. When the magnetic layer is decreased in thickness so as to solve this problem, its surface properties are adversely affected by its ability to be calendered, and this in turn produces an adverse influence on output and resolving power. However, if a magnetic layer with the thickness decreased to 0.5 µm or less, preferably 0.3 to 0.5 µm is provided on a base with a non-ferromagnetic layer such as one mentioned above interposed between them, it is then possible to achieve good-enough O/W characteristics without producing any adverse influence on the surface properties of the magnetic layer. This can make a reasonable compromise between the O/W characteristics and the output and resolving power, which has been considered difficult in the art. It is noted that while the recording wavelength and density mentioned above are explained with reference to the case where recording is carried out without recourse to ZBR, the present invention may be practiced in combination with ZBR. According to ZBR, much more information can be recorded on an outer side having a relatively high speed. Also, ZBR is favorable in terms of O/W characteristics.

EXAMPLES

The present invention will now be explained more illustratively with reference to the examples.

Example 1

Preparation of Magnetic Coating Material

A magnetic coating material having the following composition was prepared.

| Magnetic Coating Material | |
| --- | --- |
| Fe—Zn—Ni alloy | 100 PBW |
| Vinyl chloride-vinyl acetate copolymer | 10 PBW |
| Polyester polyurethane | 10 PBW |
| Polyisocyanate | 4 PBW |
| (Industrial) stearic acid | 2 PBW |
| (Industrial) butyl stearate | 2 PBW |
| Methyl ethyl ketone/cyclohexanone/toluene (= 35/35/30) | suitable amount |

Preparation of Coating Solution for Forming Non-ferromagnetic Layer (Non-ferromagnetic Coating Material)

Non-ferromagnetic Coating Material No.1 having the following composition was prepared.

| Non-ferromagnetic Coating Material No. 1 | |
| --- | --- |
| Spherical a-$Fe_2O_3$ (with the main particle diameter of 20 nm and the BET value of about 60 $m^2/g$) | 100 PBW |
| Vinyl chloride-vinyl acetate copolymer | 11 PBW |
| Polyester polyurethane | 11 PBW |
| Polyisocyanate | 4 PBW |
| (Industrial) stearic acid | 2 PBW |
| (Industrial) butyl stearate | 2 PBW |
| Methyl ethyl ketone/cyclohexanone/toluene (= 35/35/30) | 156 PBW |

Non-ferromagnetic Coating Material Nos. 2–6 were prepared by changing the particulate component used in Non-ferromagnetic Coating Material No. 1.

Non-ferromagnetic Coating Material No. 2

A coating material similar to Non-ferromagnetic Coating Material No. 1 with the exception that spherical $\alpha$-$Fe_2O_3$ (with the mean particle diameter of 30 nm and the BET value of about 40 $m^2/g$) was used as the non-ferromagnetic particles was prepared. This will be called Non-ferromagnetic Coating Material No. 2.

Non-ferromagnetic Coating Material No. 3

A coating material similar to Non-ferromagnetic Coating Material No. 1 with the exception that spherical $\alpha$-$Fe_2O_3$ (with the mean particle diameter of 60 nm and the BET value of about 30 $m^2/g$) was used as the non-ferromagnetic particles was prepared. This will be called Non-ferromagnetic Coating Material No. 3.

Non-ferromagnetic Coating Material No. 4

A coating material similar to Non-ferromagnetic Coating Material No. 1 with the exception that spherical $TiO_2$ (with the mean particle diameter of 30 nm and the BET value of about 40 $m^2/g$) was used in place of $\alpha$-$Fe_2O_3$ was prepared. This will be called Non-ferromagnetic Coating Material No. 4.

Non-ferromagnetic Coating Material No. 5

A coating material similar to Non-ferromagnetic Coating Material No. 1 with the exception that acicular $\alpha$-$Fe_2O_3$ (with the mean major axis diameter of 190 nm, the mean minor axis diameter of 30 nm and the BET value of about 50 $m^2/g$) was used as the spherical $\alpha$-$Fe_2O_3$ was prepared. This will be called Non-ferromagnetic Coating Material No. 5.

The above-mentioned magnetic coating material and each of the above-mentioned non-ferromagnetic coating materials were provided on an 8 µm thick nonmagnetic substrate of polyethylene terephthalate by an extrusion type of simultaneous superposition coating technique, followed by drying. In addition, a sample having only the non-ferromagnetic layer coated thereon was provided. Then, these samples were measured in terms of gloss and surface roughness (Ra according to JIS B0601).

The samples with the magnetic coating material coated thereon were calendered into magnetic recording tapes. Corresponding to the non-ferromagnetic coating materials used, these samples will be called Sample Nos. 1 to 5.

Sample No. 6 was obtained in the same manner as mentioned above with the exception that the wet-on-dry procedure was used in place of the wet-on-wet procedure.

The thicknesses of the non-ferromagnetic and magnetic layers of each tape sample were 2.0 μm and 0.2 μm, respectively. Also, the mean aspect ratio of the spherical particles in each of Coating Material Nos. 1 to 4 was approximately 1.

These tape samples were examined in terms of gloss and surface roughness in the same manner as mentioned above. Output and C/N ratio were estimated in the following manner.

(1) RF Video Sensitivity

An amorphous head was used to measure video sensitivity at 7 MHz.

(2) C/N

C/N is expressed in terms of the ratio of noises at places spaced 0.3 and 1.0 MHz away from 7 MHz, respectively, to RF.

The results are set out in Table 1.

referred to in Table 2. These samples will be called Sample Nos. 11 to 15. It is here noted that Sample No. 22 is substantially much the same as Sample No. 2 of Example 1.

As in Example 1, tape samples were prepared to estimate their characteristics. The results are set out in Table 2.

TABLE 1

| Sample No. | Non-ferromagnetic Coating Solution | | | Non-magnetic Layer | | Magnetic Layer | | Medium Properties | | |
|---|---|---|---|---|---|---|---|---|---|---|
| | Non-ferromagnetic Particles | Content (wt %) | particles/resin (by weight) | gloss (%) | Ra (nm) | gloss (%) | Ra (nm) | RF (dB) | C/N −0.3 | −1.0 |
| 1 | Spherical α-$Fe_2O_3$ (Mean Particle Diameter 20 nm) | 35 | 100/22 | 176 | 10.5 | 198 | 3.3 | +3.5 | +4.2 | +3.8 |
| 2 | Spherical α-$Fe_2O_3$ (Mean Particle Diameter 30 nm) | 35 | 100/22 | 174 | 12.8 | 198 | 3.4 | +3.3 | +3.9 | +3.3 |
| 3 | Spherical α-$Fe_2O_3$ (Mean Particle Diameter 30 nm) | 35 | 100/22 | 165 | 13.5 | 196 | 3.6 | +2.9 | +3.2 | +3.1 |
| 4* | Spherical $TiO_2$ (Mean Particle Diameter 30 nm) | 35 | 100/22 | 110 | 24.3 | 185 | 5.7 | +1.6 | +1.3 | +0.9 |
| 5* | Acicular α-$Fe_2O_3$ (Mean Major Axis 190 nm) (Mean Minor Axis 30 nm) | 35 | 100/22 | 145 | 16.3 | 185 | 5.7 | +2.3 | +1.9 | +1.9 |
| 6 | Spherical α-$Fe_2O_3$ (Mean Particle Diameter 20 nm) (Wet-on-Dry) | 35 | 100/22 | 174 | 12.8 | 180 | 7.8 | 0 | 0 | 0 |

*Comparison

Example 2

Samples were prepared following Sample No. 2 of Example 1 at such weight ratios of α-$Fe_2O_3$ to the resin as

TABLE 2

| Sample No. | Non-ferromagnetic Coating Solution | | | Non-magnetic Layer | | Magnetic Layer | | Medium Properties | | |
|---|---|---|---|---|---|---|---|---|---|---|
| | Non-ferromagnetic Particles | Content (wt %) | particles/resin (by weight) | gloss (%) | Ra (nm) | gloss (%) | Ra (nm) | RF (dB) | C/N −0.3 | −1.0 |
| 11 | Spherical α-$Fe_2O_3$ (Mean Particle Diameter 30 nm) | 35 | 100/15 | 176 | 11.5 | 198 | 3.3 | +3.7 | +4.2 | +4.0 |
| 12 | Spherical α-$Fe_2O_3$ (Mean Particle Diameter 30 nm) | 35 | 100/22 | 174 | 12.8 | 198 | 3.4 | +3.5 | +4.0 | +3.8 |
| 13 | Spherical α-$Fe_2O_3$ (Mean Particle Diameter 30 nm) | 35 | 100/30 | 169 | 13.2 | 196 | 3.6 | +3.3 | +3.5 | +3.5 |
| 14* | Spherical α-$Fe_2O_3$ (Mean Particle Diameter 30 nm) | 35 | 100/3 | 165 | 13.4 | The adhesion of the underlying coat was so unsatisfactory that any sample worthy of estimation could not be obtained. | | | | |

TABLE 2-continued

| | Non-ferromagnetic Coating Solution | | | Non-magnetic Layer | | Magnetic Layer | | Medium Properties | | |
|---|---|---|---|---|---|---|---|---|---|---|
| Sample | | Content | particles/resin | gloss | Ra | gloss | Ra | RF | C/N | |
| No. | Non-ferromagnetic Particles | (wt %) | (by weight) | (%) | (nm) | (%) | (nm) | (dB) | −0.3 | −1.0 |
| 15* | Spherical α-Fe$_2$O$_3$ (Mean Particle Diameter 30 nm) | 35 | 100/70 | 135 | 27.0 | During superposing coating, the overlying magnetic layer was so roughened that any sample worthy of estimation could not be obtained. | | | | |

*Comparison

Example 3

Preparation of Magnetic Coating Material

A magnetic coating material with the composition mentioned below was prepared.

| Magnetic Coating Material | |
|---|---|
| Fe—Co alloy (with the Hc of 1630 Oe and the BET of 40 m$^2$/g) | 100 PBW |
| Alpha-alumina (the mean particle diameter of 0.25 μm) | 15 PBW |
| Carbon black (with the mean particle diameter of 0.1 μm) | 5 PBW |
| Vinyl chloride copolymer | 15 PBW |
| Sulfonic acid group-containing polyester polyurethane | 10 PBW |
| Polyisocyanate | 5 PBW |
| Stearic acid | 2 PBW |
| Butyl stearate | 1 PBW |
| Isocetyl stearate | 5 PBW |
| Methyl ethyl ketone/cyclohexanone/toluene (35/35/30) | suitable amount |

Preparation of Coating Solution for Forming Non-ferromagnetic Layer (Non-ferromagnetic Coating Material)

Non-ferromagnetic Coating Material No. 1 with the composition mentioned below was prepared.

| Non-ferromagnetic Coating Material No. 21 | |
|---|---|
| Spherical α-Fe$_2$O$_3$ (with the mean particle diameter of 30 nm and the BET value of about 40 m$^2$/g) | 100 PBW |
| Carbon black #45B (made by Mitsubishi Chemical Industries, Ldt. and with the mean particle diameter of 24 nm, the BET of 137 m$^2$/g and the DBP oil absorption of 53 ml/100 g) | 40 PBW |
| Vinyl chloride copolymer | 20 PBW |
| Sulfonic acid group-containing polyester polyurethane | 8 PBW |
| Polyisocyanate | 5 PBW |
| Stearic acid | 7 PBW |
| Butyl stearate | 1 PBW |
| Isocetyl stearate | 10 PBW |
| Methyl ethyl ketone/cyclohexanone/toluene (35/35/30) | 573 PBW |

Non-ferromagnetic Coating Material No. 21 was used at varying amounts of the resin binder and solvent to prepare Non-ferromagnetic Coating Material Nos. 22 to 25. The amount of the solvent used was optionally varied while taking the ability to be coated into account. The mean aspect ratio of the spherical particles used for each sample was approximately 1.

| Non-ferromagnetic Coating Material No. 22 | |
|---|---|
| Spherical α-Fe$_2$O$_3$ (with the mean particle diameter of 30 nm and the BET value of about 40 m$^2$/g) | 100 PBW |
| Carbon black #45B (made by Mitsubishi Chemical Industries, Ldt. and with the mean particle diameter of 24 nm, the BET of 137 m$^2$/g and the DBP oil absorption of 53 ml/100 g) | 40 PBW |
| Vinyl chloride copolymer | 35 PBW |
| Sulfonic acid group-containing polyester polyurethane | 15 PBW |
| Polyisocyanate | 10 PBW |
| Stearic acid | 7 PBW |
| Butyl stearate | 1 PBW |
| Isocetyl stearate | 10 PBW |
| Methyl ethyl ketone/cyclohexanone/toluene (35/35/30) | 470 PBW |

| Non-ferromagnetic Coating Material No. 23 | |
|---|---|
| Spherical α-Fe$_2$O$_3$ (with the mean particle diameter of 30 nm and the BET value of about 40 m$^2$/g) | 100 PBW |
| Carbon black #45B (made by Mitsubishi Chemical Industries, Ldt. and with the mean particle diameter of 24 nm, the BET of 137 m$^2$/g and the DBP oil absorption of 53 ml/100 g) | 40 PBW |
| Vinyl chloride copolymer | 11 PBW |
| Sulfonic acid group-containing polyester polyurethane | 4 PBW |
| Polyisocyanate | 3 PBW |
| Stearic acid | 7 PBW |
| Butyl stearate | 1 PBW |
| Isocetyl stearate | 10 PBW |
| Methyl ethyl ketone/cyclohexanone/toluene (35/35/30) | 520 PBW |

| Non-ferromagnetic Coating Material No. 24 | |
|---|---|
| Spherical α-Fe$_2$O$_3$ (with the mean particle diameter of 30 nm and the BET value of about 40 m$^2$/g) | 100 PBW |
| Carbon black #45B (made by Mitsubishi Chemical Industries, Ldt. and with the mean particle diameter of 24 nm, the BET of 137 m$^2$/g and the DBP oil absorption of 53 ml/100 g) | 40 PBW |
| Vinyl chloride copolymer | 56 PBW |
| Sulfonic acid group-containing polyester polyurethane | 24 PBW |
| Polyisocyanate | 16 PBW |
| Stearic acid | 7 PBW |
| Butyl stearate | 1 PBW |
| Isocetyl stearate | 10 PBW |
| Methyl ethyl ketone/cyclohexanone/toluene (35/35/30) | 520 PBW |

| Non-ferromagnetic Coating Material No. 25 | |
|---|---|
| Spherical α-Fe$_2$O$_3$ (with the mean particle diameter of 30 nm and the BET value of about 40 m$^2$/g) | 100 PBW |
| Carbon black #45B (made by Mitsubishi Chemical Industries, Ldt. and with the mean particle diameter of 24 nm, the BET of 137 m$^2$/g and the DBP oil absorption of 53 ml/100 g) | 40 PBW |
| Vinyl chloride copolymer | 2.5 PBW |

-continued

| Non-ferromagnetic Coating Material No. 25 | |
| --- | --- |
| Sulfonic acid group-containing polyester polyurethane | 2.5 PBW |
| Polyisocyanate | 1 PBW |
| Stearic acid | 7 PBW |
| Butyl stearate | 1 PBW |
| Isocetyl stearate | 10 PBW |
| Methyl ethyl ketone/cyclohexanone/toluene (35/35/30) | 470 PBW |

The above-mentioned magnetic coating material and each of the above-mentioned non-ferromagnetic coating materials were provided on a 62 μm thick nonmagnetic substrate of polyethylene terephthalate by an extrusion type of simultaneous superposition coating technique, followed by drying. In addition, a sample having only the non-ferromagnetic layer coated thereon was provided. Then, these samples were measured in terms of gloss, surface electric resistance and surface roughness (Ra according to JIS B0601).

The samples with the magnetic coating material coated thereon were calendered and punched into 3.5 inch floppy discs. Corresponding to the non-ferromagnetic coating materials used, these samples will be called Sample Nos. 21 to 25. Sample No. 26 was obtained in the same manner as mentioned above with the exception that the wet-on-dry procedure was used in place of the wet-on-wet procedure.

The thicknesses of the non-ferromagnetic and magnetic layers of each disc sample were 1.5 μm and 0.45 μm, respectively.

These tape samples were examined in terms of gloss, surface electric resistance and surface roughness in the same manner as mentioned above. The electromagnetic transducing characteristics were estimated in the following manner.

Using a floppy disc drive FD 1331 made by NEC Corporation, 1F signals (315.5 kHz) were recorded on trk 000 to measure the output called 1F output. Also, 2F signals (625 kHz) were recorded on trk 239 to measure the output called 2F output. Note that the electromagnetic transducing characteristics of Sample No. 6 are used for control.

The results are set out in Table 3.

Example 4

Non-ferromagnetic Coating Material Nos. 31 to 35 were prepared following the procedure of preparing Non-ferromagnetic Coating Material No. 21 in Example 3 with the exception that various non-ferromagnetic particles were used.

Non-ferromagnetic Coating Material No. 31

A coating material similar to Non-ferromagnetic Coating Material No. 21 with exception that the non-ferromagnetic particles were changed to spherical $\alpha$-$Fe_2O_3$ (with the mean particle diameter of 20 nm and the BET value of about 60 $m^2/g$) was prepared. This will be called Non-ferromagnetic Coating Material No. 31.

Non-ferromagnetic Coating Material No. 32

A coating material similar to Non-ferromagnetic Coating Material No. 21 with exception that the non-ferromagnetic particles were changed to spherical $\alpha$-$Fe_2O_3$ (with the mean particle diameter of 60 nm and the BET value of about 30 $m^2/g$) was prepared. This will be called Non-ferromagnetic Coating Material No. 32.

Non-ferromagnetic Coating Material No. 33

A coating material similar to Non-ferromagnetic Coating Material No. 21 with exception that the non-ferromagnetic particles were changed to spherical $TiO_2$ (with the mean particle diameter of 30 nm and the BET value of about 40 $m^2/g$) was prepared. This will be called Non-ferromagnetic Coating Material No. 33.

Non-ferromagnetic Coating Material No. 34

A coating material similar to Non-ferromagnetic Coating Material No. 21 with exception that the non-ferromagnetic particles were changed to acicular $\alpha$-$Fe_2O_3$ (with the mean major and minor axis diameters of 190 nm and 30 nm, respectively, and the BET value of about 30 $m^2/g$) was prepared. This will be called Non-ferromagnetic Coating Material No. 34.

TABLE 3

| | Non-magnetic Layer | | | | | Non-magnetic Layer (green) | Magnetic Layer (green) | | Magnetic Layer (after processing) | | | Output | |
| --- | --- | --- | --- | --- | --- | --- | --- | --- | --- | --- | --- | --- | --- |
| Sample No. | Non-ferromagnetic Particles (PBW) | Carbon (PBW) | Binder (PBW) | Gloss (%) | Ra (nm) | Electrical Resistance (Ω/sq) | Gloss (%) | Ra (nm) | Gloss (%) | Ra (nm) | Electrical resistance (Ω/sq) | 1F (%) | 2F (%) |
| 21 | $\alpha$-$Fe_2O_3$ (100) | #45B (40) | 28 | 140 | 17 | $<10^6$ | 104 | 28 | 170 | 5 | $2 \times 10^6$ | 102 | 110 |
| 22 | $\alpha$-$Fe_2O_3$ (100) | #45B (40) | 50 | 154 | 13 | $6 \times 10^6$ | 99 | 32 | 165 | 7 | $3 \times 10^6$ | 100 | 106 |
| 23 | $\alpha$-$Fe_2O_3$ (100) | #45B (40) | 15 | 113 | 34 | $<10^6$ | 95 | 35 | 165 | 7 | $3 \times 10^6$ | 100 | 106 |
| 24* | $\alpha$-$Fe_2O_3$ (100) | #45B (40) | 80 | 117 | 46 | $1 \times 10^{10}$ | 83 (Roughened Surface) | 52 | 156 | 14 | $4 \times 10^6$ | 96 | 93 |
| 25* | $\alpha$-$Fe_2O_3$ (100) | #45B (40) | 5 | 29 | | (No coating material worthy of estimation could be obtained: no measurement could be done.) | | | | | | | |
| 26 | $\alpha$-$Fe_2O_3$ (100) | #45B (40) | (wet on dry) 28 | 140 | 17 | $<10^6$ | 89 | 39 | 160 | 10 | $3 \times 10^6$ | 100 | 100 |

*Comparison

As in Example 3, floppy discs were prepared for estimation. The results are set out in Table 4.

used as the carbon black was prepared. This will be called Non-ferromagnetic Coating Material No. 43.

TABLE 4

| | Non-magnetic Layer | | | Non-magnetic Layer (green) | | | Magnetic Layer (green) | | Magnetic Layer (after processing) | | | Output | |
|---|---|---|---|---|---|---|---|---|---|---|---|---|---|
| Sample No. | Non-ferromagnetic Particles (PBW) | Carbon (PBW) | Binder (PBW) | Gloss (%) | Ra (nm) | Electrical Resistance ($\Omega$/sq) | Gloss (%) | Ra (nm) | Gloss (%) | Ra (nm) | Electrical resistance ($\Omega$/sq) | 1F (%) | 2F (%) |
| 31 | $\alpha$-Fe$_2$O$_3$ (Mean Particle Diameter 20 nm) (100) | #45B (40) | (28) | 140 | 22 | <10$^6$ | 103 | 32 | 170 | 5 | 2 × 10$^6$ | 102 | 112 |
| 21 | $\alpha$-Fe$_2$O$_3$ (Mean Particle Diameter 30 nm) (100) | #45B (40) | (28) | 140 | 17 | <10$^6$ | 104 | 28 | 170 | 5 | 2 × 10$^6$ | 102 | 110 |
| 32 | $\alpha$-Fe$_2$O$_3$ (Mean Particle Diameter 60 nm) (100) | #45B (40) | (28) | 140 | 18 | <10$^6$ | 102 | 28 | 168 | 6 | 3 × 10$^6$ | 100 | 108 |
| 33* | Spherical TiO$_2$ (Mean Particle Diameter 30 nm) (100) | #45B (40) | (28) | 100 | 24 | <10$^6$ | 100 | 35 | 163 | 9 | 4 × 10$^6$ | 100 | 100 |
| 34* | Acicular $\alpha$-Fe$_2$O$_3$ (Mean Major Axis 190 nm) (Mean Minor Axis 30 nm) (100) | #45B (40) | (28) | 111 | 23 | <10$^6$ | 111 | 37 | 162 | 8 | 2 × 10$^6$ | 100 | 100 |

*Comparison

Example 5

Non-ferromagnetic Coating Material Nos. 41 to 47 were prepared following the procedure of Example 3 with the exception that various carbon blacks were used. The carbon blacks used were all made by Mitsubishi Chemical Industries, Ltd.

Non-ferromagnetic Coating Material No. 41

A coating material similar to Non-ferromagnetic Coating Material No. 21 with the exception that #45L (with the mean particle diameter of 24 nm, the BET value of about 127 m$^2$/g and the DBP oil absorption of about 43 ml/100 g) was used as the carbon black was prepared. This will be called Non-ferromagnetic Coating Material No. 41.

Non-ferromagnetic Coating Material No. 42

A coating material similar to Non-ferromagnetic Coating Material No. 21 with the exception that #52B (with the mean particle diameter of 27 nm, the BET value of about 113 m$^2$/g and the DBP oil absorption of about 58 ml/100 g) was used as the carbon black was prepared. This will be called Non-ferromagnetic Coating Material No. 42.

Non-ferromagnetic Coating Material No. 43

A coating material similar to Non-ferromagnetic Coating Material No. 21 with the exception that #CF9B (with the mean particle diameter of 40 nm, the BET value of about 60 m$^2$/g and the DBP oil absorption of about 65 ml/100 g) was used as the carbon black was prepared. This will be called Non-ferromagnetic Coating Material No. 43.

Non-ferromagnetic Coating Material No. 44

A coating material similar to Non-ferromagnetic Coating Material No. 21 with the exception that #5B (with the mean particle diameter of 85 nm, the BET value of about 25 m$^2$/g and the DBP oil absorption of about 71 ml/100 g) was used as the carbon black was prepared. This will be called Non-ferromagnetic Coating Material No. 44.

Non-ferromagnetic Coating Material No. 45

A coating material similar to Non-ferromagnetic Coating Material No. 21 with the exception that #10B (with the mean particle diameter of 84 nm, the BET value of about 28 m$^2$/g and the DBP oil absorption of about 83 ml/100 g) was used as the carbon black was prepared. This will be called Non-ferromagnetic Coating Material No. 45.

Non-ferromagnetic Coating Material No. 46

A coating material similar to Non-ferromagnetic Coating Material No. 21 with the exception that #3170B (with the mean particle diameter of 25 nm, the BET value of about 180 m$^2$/g and the DBP oil absorption of about 115 ml/100 g) was used as the carbon black was prepared. This will be called Non-ferromagnetic Coating Material No. 46.

As in Example 3, floppy discs were prepared for estimation. The results are set out in Table 5.

TABLE 5

| Sample No. | Non-magnetic Layer Non-ferromagnetic Particles (PBW) | Carbon (PBW) | Binder (PBW) | Non-magnetic Layer (green) Gloss (%) | Ra (nm) | Electrical Resistance (Ω/sq) | Magnetic Layer (green) Gloss (%) | Ra (nm) | Magnetic Layer (after processing) Gloss (%) | Ra (nm) | Electrical resistance (Ω/sq) | Output 1F (%) | 2F (%) |
|---|---|---|---|---|---|---|---|---|---|---|---|---|---|
| 21 | α-Fe$_2$O$_3$ (100) | #45B (40) | (28) | 140 | 17 | <10$^6$ | 104 | 28 | 170 | 5 | 2 × 10$^6$ | 102 | 110 |
| 42 | α-Fe$_2$O$_3$ (100) | #45L (40) | (28) | 146 | 16 | <10$^6$ | 98 | 34 | 168 | 6 | 10$^6$ | 100 | 109 |
| 43 | α-Fe$_2$O$_3$ (100) | #52B (40) | (28) | 144 | 12 | <10$^6$ | 99 | 31 | 168 | 6 | 10$^6$ | 100 | 108 |
| 44 | α-Fe$_2$O$_3$ (100) | CF9B (40) | (28) | 146 | 12 | <10$^6$ | 96 | 29 | 165 | 7 | 2 × 10$^6$ | 100 | 106 |
| 45* | α-Fe$_2$O$_3$ (100) | #5B (40) | (28) | 95 | 35 | <10$^6$ | 89 | 41 | 158 | 11 | 4 × 10$^6$ | 98 | 96 |
| 46* | α-Fe$_2$O$_3$ (100) | #10B (40) | (28) | 91 | 36 | <10$^6$ | 88 | 43 | 157 | 12 | 3 × 10$^6$ | 96 | 96 |
| 47* | α-Fe$_2$O$_3$ (100) | #3170B (40) | (28) | 90 | 32 | <10$^6$ | 90 | 40 | 158 | 10 | <10$^6$ | 98 | 98 |

*Comparison

Example 6

Non-ferromagnetic Coating Material Nos. 51 to 54 were prepared following the procedure of making Non-ferromagnetic Coating Material No. 21 in Example 3 with the exception that carbon black #45B was used in such varying amounts referred to in Table 6. It is here noted that the amount of the resin binder, too, was varied such that the ratio of the total amount of the ultrafine form of iron oxide and carbon black to the amount of the resin binder was 5/1. As in Example 3, floppy discs were prepared for estimation. The results are set out in Table 6.

| Magnetic Coating Material | |
|---|---|
| Fe—Zn—Ni alloy | 100 PBW |
| Vinyl chloride-vinyl acetate copolymer | 10 PBW |
| Polyester polyurethane | 10 PBW |
| Polyisocyanate | 4 PBW |
| (Industrial) stearic acid | 2 PBW |
| (Industrial) butyl acid | 2 PBW |
| Methyl ethyl ketone/cyclohexanone/toluene (= 35/35/30) | suitable amount |

TABLE 6

| Sample No. | Non-magnetic Layer Non-ferromagnetic Particles (PBW) | Carbon (PBW) | Binder (PBW) | Non-magnetic Layer (green) Gloss (%) | Ra (nm) | Electrical Resistance (Ω/sq) | Magnetic Layer (green) Gloss (%) | Ra (nm) | Magnetic Layer (after processing) Gloss (%) | Ra (nm) | Electrical resistance (Ω/sq) | Output 1F (%) | 2F (%) |
|---|---|---|---|---|---|---|---|---|---|---|---|---|---|
| 51 | α-Fe$_2$O$_3$ (100) | #45B (30) | (26) | 156 | 15 | <10$^6$ | 106 | 31 | 169 | 6 | 4 × 10$^8$ | 100 | 110 |
| 21 | α-Fe$_2$O$_3$ (100) | #45B (40) | (28) | 140 | 17 | 6 <10$^6$ | 104 | 28 | 170 | 5 | 2 × 10$^6$ | 102 | 110 |
| 52 | α-Fe$_2$O$_3$ (100) | #45B (50) | (30) | 134 | 21 | <10$^6$ | 103 | 33 | 168 | 6 | <10$^6$ | 100 | 108 |
| 53* | α-Fe$_2$O$_3$ (100) | #45B (5) | (21) | 163 | 12 | <10$^6$ | 84 (Roughened Surface) | 52 | 155 | 15 | 3 × 10$^{11}$ | 95 | 91 |
| 54* | α-Fe$_2$O$_3$ (100) | #45B (80) | (36) | 103 | 52 | <10$^6$ | 99 | 40 | 158 | 11 | <10$^6$ | 97 | 98 |

*Comparison

Example 7

Preparation of Magnetic Coating Material

A magnetic coating material with the composition mentioned below was prepared.

Preparation of Coating Solution for Forming Nonmagnetic Layer (Nonmagnetic Coating Material)

| Nonmagnetic Coating Material No. 61 | |
|---|---|
| #42BZ (made by Mitsubishi Chemical Industries, Ltd. and with the mean particle diameter of 24 nm, the BET value of 137 m$^2$/g, the DBP oil absorption of 53 ml/100 g and the pH value of 8) | 100 PBW |

| Nonmagnetic Coating Material No. 61 | |
| --- | --- |
| Vinyl chloride-vinyl acetate copolymer | 20 PBW |
| Polyester polyurethane | 20 PBW |
| Polyisocyanate | 8 PBW |
| Methyl ethyl ketone/cyclohexanone/toluene (= 35/35/30) | 519 PBW |

Nonmagnetic Coating Material Nos. 62 to 75 were prepared following Nonmagnetic Coating Material No. 61 with the exception that such carbon products as mentioned in Tables 7 and 8. The carbon products used are all made by Mitsubishi Chemical Industries, Ltd.

The above-mentioned magnetic coating material and each of the above-mentioned nonmagnetic coating materials were provided on an 8 μm thick nonmagnetic substrate of polyethylene terephthalate by an extrusion type of simultaneous superposition coating technique, followed by drying. In addition, a sample having only the non-ferromagnetic layer coated thereon was provided. Then, these samples were measured in terms of gloss and surface roughness (Ra according to JIS B0601).

The samples with the magnetic coating material coated thereon were calendered into magnetic recording tapes.

Corresponding to the nonmagnetic coating materials used, these samples will be called Sample Nos. 61 to 75. Sample No. 76 was obtained following Sample No. 61 with the exception that the wet-on-dry procedure was used in place of the wet-on-wet procedure.

It is noted that the thicknesses of the non-magnetic and magnetic layers of these tape samples were 2.0 μm and 0.2 μm, respectively.

These tape samples were examined in terms of gloss and surface roughness in the same manner as mentioned above. Output and C/N ratio were estimated in the following manner.

(1) RF Video Sensitivity

An amorphous head was used to measure video sensitivity at 7 MHz.

(2) C/N

C/N is expressed in terms of the ratio of noises at places spaced 0.3 and 1.0 MHz away from 7 MHz, respectively, to RF.

The results are set out in Tables 7 and 8.

TABLE 7

| | | Non-magnetic coating material | | | | Non-magnetic Layer | | Magnetic Layer | | Medium Properties | | |
| --- | --- | --- | --- | --- | --- | --- | --- | --- | --- | --- | --- | --- |
| | | Mean Particle Size | BET | DBP Oil Absorption | Content | carbon/resin | gloss | Ra | gloss | Ra | RF | C/N | |
| Sample No. | Carbon | (nm) | (m²/g) | (ml/100 g) | (wt %) | (by weight) | (%) | (nm) | (%) | (nm) | (dB) | −0.3 | −1.0 |
| 61 | #45B (pH 8) | 24 | 137 | 53 | 15 | 100/40 | 152 | 10.3 | 198 | 3.3 | +3.4 | +3.1 | +3.3 |
| 62 | MA8B (pH 3) | 24 | 137 | 53 | 15 | 100/40 | 150 | 11.0 | 198 | 3.4 | +3.1 | +2.9 | +2.8 |
| 63 | #45L | 24 | 127 | 43 | 15 | 100/40 | 152 | 10.0 | 199 | 3.2 | +3.4 | +3.2 | +3.0 |
| 64 | #52B | 27 | 113 | 58 | 15 | 100/40 | 148 | 11.5 | 195 | 3.6 | +2.8 | +2.5 | +7.6 |
| 65 | CF9B | 40 | 60 | 65 | 15 | 100/40 | 145 | 12.5 | 195 | 3.8 | +2.5 | +2.0 | +1.9 |
| 66* | #5B | 85 | 25 | 71 | 15 | 100/40 | 78 | 25.4 | 168 | 6.0 | 0 | −0.3 | +0.5 |
| 67* | #10B | 84 | 28 | 83 | 15 | 100/40 | 74 | 27.0 | 165 | 6.4 | −0.3 | −1.0 | +0.2 |
| 68* | #45B | 24 | 137 | 53 | 15 | 100/70 | 130 | 15.5 | 168 | 7.5 | −1.0 | −1.5 | −0.1 |
| 69* | #45B | 24 | 137 | 53 | 15 | 100/100 | 125 | 18.0 | 165 | 6.5 | −0.3 | −1.0 | +0.6 |
| 70* | #45B | 24 | 137 | 53 | 15 | 100/22 | 97 | 20.0 | 155 | 7.6 | −1.2 | −1.7 | +0.8 |

*Comparison

TABLE 8

| | | Non-magnetic coating material | | | | Non-magnetic Layer | | Magnetic Layer | | Medium Properties | | |
| --- | --- | --- | --- | --- | --- | --- | --- | --- | --- | --- | --- | --- |
| | | Mean Particle Size | BET | DBP Oil Absorption | Content | carbon/resin | gloss | Ra | gloss | Ra | RF | C/N | |
| Sample No. | Carbon | (nm) | (m²/g) | (ml/100 g) | (wt %) | (by weight) | (%) | (nm) | (%) | (nm) | (dB) | −0.3 | −1.0 |
| 71* | #20B | 40 | 56 | 115 | 15 | 100/40 | 70 | 27.5 | 165 | 6.7 | −0.5 | −1.4 | −1.0 |
| 72* | #40B | 20 | 135 | 110 | 15 | 100/40 | 109 | 19.2 | 170 | 6.5 | −0.3 | −1.2 | +0.5 |
| 73* | #3170B | 25 | 180 | 115 | 15 | 100/40 | 110 | 18.5 | 169 | 6.1 | 0 | −0.3 | +0.2 |
| 74* | #45B | 24 | 137 | 53 | 5 | 100/40 | 147 | 15.0 | 155 | 7.4 | −0.6 | −0.8 | −0.1 |
| 75* | #45B | 24 | 137 | 53 | 25 | 100/40 | 145 | 16.5 | 178 | 5.5 | +0.7 | +0.9 | +1.5 |
| 76* | #45B (Wet-on-Dry) | 24 | 137 | 53 | 15 | 100/40 | 152 | 10.3 | 190 | 4.5 | +1.0 | +0.7 | +1.5 |

*Comparison

Example 8

Preparation of Magnetic Coating Material

A magnetic coating material having the following composition was prepared.

| Magnetic Coating Material | |
|---|---|
| Fe—Co alloy (with the Hc of 1630 Oe and the BET of 40 m²/g) | 100 PBW |
| Alpha-alumina (the mean particle diameter of 0.25 μm) | 15 PBW |
| Carbon black (with the mean particle diameter of 0.1 μm) | 5 PBW |
| Vinyl chloride copolymer | 15 PBW |
| Sulfonic acid group-containing polyester polyurethane | 10 PBW |
| Polyisocyanate | 5 PBW |
| Stearic acid | 2 PBW |
| Butyl stearate | 1 PBW |
| Isocetyl stearate | 5 PBW |
| Methyl ethyl ketone/cyclohexanone/toluene (35/35/30) | suitable amount |

Preparation of Coating Solution for Forming Non-ferromagnetic Layer (Non-ferromagnetic Coating Material A non-ferromagnetic coating material with the composition mentioned below was prepared.

| Non-ferromagnetic Coating Material (spherical α-Fe₂O₃ + carbon black/binder = 140/28) | |
|---|---|
| Spherical α-Fe₂O₃ (with the mean particle diameter of 30 nm and the BET value of about 40 m²/g) | 100 PBW |
| Carbon black #45B (made by Mitsubishi Chemical Industries, Ldt. and with the mean particle diameter of 24 nm, the BET of 137 m²/g and the DBP oil absorption of 53 ml/100 g) | 40 PBW |
| Vinyl chloride copolymer | 20 PBW |
| Sulfonic acid group-containing polyester polyurethane | 8 PBW |
| Polyisocyanate | 5 PBW |
| Stearic acid | 7 PBW |
| Butyl stearate | 1 PBW |
| Isocetyl stearate | 10 PBW |
| Methyl ethyl ketone/cyclohexanone/toluene (35/35/30) | 573 PBW |

Preparation of FD Samples

The magnetic coating material mentioned above was coated on a 62 μm thick nonmagnetic substrate of polyethylene terephthalate, followed by drying, and then calendered and punched into a 3.5 inch floppy disc. This will be called FD Sample NO. 81. The magnetic layer was 2.5 mm in thickness.

Following the procedure of making FD Sample No. 81, FD Sample No. 82 was prepared with the exception that the thickness of the magnetic layer was 0.45 μm.

The magnetic and non-ferromagnetic coating materials mentioned above were coated on a 62 μm thick nonmagnetic substrate of polyethylene terephthalate and then dried to prepare FD Sample No. 83. The magnetic and non-ferromagnetic layers were 0.45 mm and 0.7 μm in thickness, respectively.

The surface roughness (Ra provided by JIS B0601) of each FD sample was found. Moreover, the output, resolving power and O/W characteristics of each FD sample were estimated using a floppy disc drive FD 1335 made by NEC Corporation. Here it is noted that the floppy disc drive operates on the MFM recording mode and measurements are obtained on the (2, 7) code mode; the recording frequency was changed, as mentioned just below.

Standard Spec. 1F: 321.5 kHz 2F: 625 kHz

Remodeled Spec. RL7:234 kHz RL2:625 kHz

The floppy disc drive mentioned above operates at 360 rpm with the track radii of 23.014 mm on the innermost side 1 and 39.500 mm on the outermost side 0. The then wavelength and recording density are already mentioned somewhere in the present disclosure. Since the floppy disc is not accompanied by ZBR, this is the severest condition for O/W characteristics. It is noted that the maximum magnetization inversion separation on the same track is 2.67 times as large as the minimum magnetization inversion separation.

(1) Output

RL2 was recorded on the innermost side 1 and the mean signal amplitude was measured on an oscilloscope.

(2) Resolving Power

RL7 and RL2 were recorded on the outermost side 1 and the mean signal amplitudes were each measured by means of an oscilloscope. Resolving power is found by Resolving Power =
(mean signal amplitude of RL2/mean signal amplitude of RL7) × 100

(3) O/W characteristics

RL7 was recorded on the outermost side 0 and the mean signal amplitude was measured. Without erase, RL2 was overwritten on RL7 to measure the residual mean signal amplitude of RL7. The O/W value is found by O/W=20 Log (residual mean signal amplitude of RL7/ mean signal amplitude of RL7)

These mean signal amplitudes were measured with the use of a spectral analyzer.

The results are set out in Table 9. It is noted that FD Sample No. 81 is a conventional floppy disc. Output and resolving power were estimated by reference to this control disc assumed to have 100.0% output and resolving power.

TABLE 9

| Sample No. | Thickness of Magnetic Layer, μm | Thickness of Non-Magnetic Layer, μm | Type of Coating | Surface Roughness, Ra (nm) | Output (36.6kFCI) | Power Resolving (%) | O/W (dB) |
|---|---|---|---|---|---|---|---|
| 81* | 2.5 | — | Single layer | 6.5 | 100.0 | 100.0 | −25.5 |
| 82* | 0.45 | — | Single layer | 11.5 | 88.5 | 98.0 | −29.2 |
| 83 | 0.45 | 0.7 | wet on wet | 6.0 | 110.4 | 105.1 | −30.7 |

*Comparison

The effect of the present invention can be clearly understood from Table 9. This table indicates that Sample No. 82 is somewhat improved in terms of O/W characteristics over Sample No. 81 because the magnetic layer used is thin, but the output and resolving power of Sample No. 82 are low, because the surface properties of the magnetic layer are adversely affected by a drop of the ability of the magnetic layer to be calendered. As can be understood, it is when, as is the case with Sample No. 83 of the invention, superposition coating is carried out in the wet-on-wet fashion with a non-ferromagnetic layer of 0.5 µm or more in thickness that the effect of the invention is achieved.

Several samples similar to Sample No. 83 with the exception that the thickness of the non-ferromagnetic layer varied between 0.5 µm and 2.5 µm were prepared. They were found to be equivalent in characteristics to Sample No. 83. A sample similar to No. 83 with the exception that the non-ferromagnetic layer was of 0.5 µm or less (e.g., 0.45 µm) was prepared, and another sample similar to No. 83 were prepared in the wet-on-dry fashion, not in the wet-on-wet fashion. These samples were all found to be poorer than No. 83 in terms of output, resolving power and O/W characteristics.

What is claimed is:

1. A magnetic recording medium comprising,
   (A) a nonmagnetic base;
   (B) a magnetic layer on said base, comprising magnetic powders and a resin binder; and
   (C) a non-ferromagnetic layer, between said base and said magnetic layer, comprising
      (i) 100 parts by weight of a substantially spherical, non-ferromagnetic, particulate iron oxide, and
      (ii) 15 to 30 parts by weight of a resin binder based upon 100 parts by weight of said spherical, non-ferromagnetic, particulate iron oxide,
   wherein said non-ferromagnetic layer and said magnetic layer are provided in a wet-on-wet fashion.

2. A magnetic recording medium as recited in claim 1, wherein said spherical, non-ferromagnetic comprises substantially particulate iron oxide $\alpha\text{-Fe}_2O_3$.

3. A magnetic recording medium as recited in claim 1, wherein said spherical non-ferromagnetic substantially particulate iron oxide has a mean particle diameter of 20 to 80 nm.

4. A magnetic recording medium as recited in claim 1, wherein said spherical non-ferromagnetic substantially particulate iron oxide has a specific surface area of 20 to 80 $m^2/g$, as measured by the BET method.

5. A magnetic recording medium as recited in claim 1, wherein said non-ferromagnetic layer is formed with the use of a coating solution containing said spherical non-ferromagnetic substantially particulate iron oxide at a content of 10 to 60% by weight based upon the total weight of said coating solution.

6. A magnetic recording medium as recited in claim 1, wherein said non-ferromagnetic layer further contains a nonmagnetic, electrically conductive substance.

7. A magnetic recording medium as recited in claim 6, wherein a weight ratio of the total amount of spherical, non-ferromagnetic substantially particulate iron oxide and electrically conductive substance, to the resin binder, lies between 100 to 50 and 100 to 5.

8. A magnetic recording medium as recited in claim 6, wherein said electrically conductive substance has a mean particle diameter of 10 to 60 nm, a specific surface area of 150 $m^2/g$ or less as measured by the BET method, and a DBP oil absorption of 100 ml/100 g or less.

9. A magnetic recording medium as recited in claim 8, wherein said electrically conductive substance has a specific surface area of 20 to 150 $m^2/g$ as measured by the BET method and a DBP oil absorption of 20 to 100 ml/100 g.

10. A magnetic recording medium as recited in claim 8, wherein said electrically conductive substance is carbon.

11. A magnetic recording medium as recited in claim 1, wherein said non-ferromagnetic layer has a thickness of 0.5 to 2.5 µm.

12. A magnetic recording medium as recited in claim 1, wherein said magnetic layer has a thickness of 2.5 µm or less.

13. A magnetic recording medium as recited in claim 1, in which said non-magnetic base is a flexible disk member and said magnetic recording medium is used as a magnetic recording disk for recording on a group coded recording mode with a minimum magnetization inversion separation of 0.75 µm or less.

14. A magnetic recording medium as recited in claim 13, wherein the maximum magnetization inversion separation of a data portion on the same track is 2.5 to 5 times as large as the minimum magnetization inversion separation.

15. A magnetic recording medium as recited in claim 6, wherein said non-ferromagnetic layer further comprises;
   20 to 70 parts by weight of said non-magnetic electrically conductive substance based upon 100 parts by weight of said spherical, non-ferromagnetic, particulate iron oxide.

16. A magnetic recording medium as recited in claim 1, wherein said particulate iron oxide has a mean aspect ratio of 1 to 1.5.

17. A magnetic recording medium comprising,
   (A) a nonmagnetic base;
   (B) a magnetic layer on said base, comprising magnetic powders and a resin binder; and
   (C') a non-ferromagnetic layer, between said base and said magnetic layer, comprising
      (i') 100 parts by weight of carbon, and
      (ii) 50 to 25 parts by weight of a resin binder based upon 100 parts by weight of said carbon,
   wherein said carbon has a mean particle diameter of 10 to 60 nm, a specific surface area of 150 $m^2/g$ or less as measured by the BET method, and a DBP oil absorption of 100 ml/100 g or less,
   said non-ferromagnetic layer and said magnetic layer are provided in a wet-on-wet fashion, and
   said non-ferromagnetic layer is formed from a coating solution comprising 10 to 20% by weight of said carbon based upon the total weight of said coating solution.

18. A magnetic recording medium as recited in claim 17, wherein said carbon has a specific surface area of 20 to 150 $m^2/g$ as measured by the BET method and a DBP oil absorption of 20 to 100 ml/100 g.

19. A magnetic recording medium as recited in claim 17, wherein said magnetic layer is 2.5 µm or less in thickness.

20. A magnetic recording medium as recited in claim 17, wherein the magnetic powders contained in said magnetic layer are magnetic powders of a metal oxide or metal.

* * * * *

UNITED STATES PATENT AND TRADEMARK OFFICE
CERTIFICATE OF CORRECTION

PATENT NO. : 5,698,286

DATED : DECEMBER 16, 1997

INVENTOR(S): TSUNEHIKO IKARASHI ET AL

It is certified that an error appears in the above-identified patent and that said Letters Patent is hereby corrected as shown below:

Column 29, lines 39-40, "wherein said spherical, non-ferromagnetic comprises substantially particulate iron oxide $\alpha\text{-}Fe_2O_3$" should read --wherein said substantially spherical, non-ferromagnetic particulate iron oxide comprises $\alpha\text{-}Fe_2O_3$--.

Column 29, lines 42-43, "said spherical non-ferromagnetic substantially particulate iron oxide" should read --said substantially spherical, non-ferromagnetic particulate iron oxide--.

Column 29, lines 47-48, "said spherical non-ferromagnetic substantially particulate iron oxide" should read --said substantially spherical, non-ferromagnetic particulate iron oxide--.

Column 29, lines 52-53, "said spherical non-ferromagnetic substantially particulate iron oxide" should read --said substantially spherical, non-ferromagnetic particulate iron oxide--.

Column 29, line 61, "of spherical" should read --of substantially spherical--
 line 62 "non-ferromagnetic substantially particulate " should read --non-ferromagnetic particulate--.

Signed and Sealed this

Fourteenth Day of December, 1999

Attest:

Attesting Officer

Q. TODD DICKINSON

Acting Commissioner of Patents and Trademarks